United States Patent
Izumi et al.

(10) Patent No.: US 12,351,166 B2
(45) Date of Patent: Jul. 8, 2025

(54) VEHICLE CONTROL DEVICE

(71) Applicants: DENSO CORPORATION, Kariya (JP); TOYOTA JIDOSHA KABUSHIKI KAISHA, Toyota (JP)

(72) Inventors: Yuusuke Izumi, Kariya (JP); Arifumi Matsumoto, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 18/160,970

(22) Filed: Jan. 27, 2023

(65) Prior Publication Data

US 2023/0166730 A1 Jun. 1, 2023

Related U.S. Application Data

(63) Continuation of application No. PCT/JP2021/027543, filed on Jul. 26, 2021.

(30) Foreign Application Priority Data

Jul. 31, 2020 (JP) .............................. 2020-130852

(51) Int. Cl.
*B60W 30/09* (2012.01)
*B60R 21/0134* (2006.01)
(Continued)

(52) U.S. Cl.
CPC ......... *B60W 30/09* (2013.01); *B60R 21/0134* (2013.01); *B60W 10/18* (2013.01);
(Continued)

(58) Field of Classification Search
CPC ..................................................... B60W 30/09
See application file for complete search history.

(56) References Cited

U.S. PATENT DOCUMENTS 10,679,502 B2 * 6/2020 Baba .................... B60W 30/09
2019/0073903 A1 * 3/2019 Baba .................... G01S 13/931

FOREIGN PATENT DOCUMENTS

JP 2007334598 A * 12/2007
JP 2011-121491 A 6/2011
(Continued)

*Primary Examiner* — Shelley Chen
(74) *Attorney, Agent, or Firm* — Maschoff Brennan

(57) ABSTRACT

A vehicle control device activates a safety device for suppressing a collision between a host vehicle and an oncoming vehicle that is traveling straight along an oncoming traffic lane, when the host vehicle changes from traveling straight along its own traffic lane to making a right or left turn to cross the oncoming traffic lane. The vehicle control device includes a judgement unit and a control unit, where the judgement unit judges when the host vehicle is in a right or left turning condition prior to crossing the oncoming traffic lane, and if is determined that the host vehicle is in the right or left turning condition, the control unit activates the safety device based on a time to lateral collision. The time to lateral collision is obtained by dividing a lateral distance by a lateral velocity, where the lateral velocity is the velocity of the host vehicle in a lateral direction orthogonal to the straight travel direction of the oncoming vehicle, and the lateral distance is the distance, in the lateral direction, from the host vehicle to a predetermined vehicle traffic area defined along the straight travel path of the oncoming vehicle.

5 Claims, 5 Drawing Sheets

(51) Int. Cl.
   *B60W 10/18*     (2012.01)
   *B60W 30/095*    (2012.01)
   *B60W 40/105*    (2012.01)
   *B60W 50/14*     (2020.01)
   *B60R 21/00*         (2006.01)
   *B60R 21/01*         (2006.01)

(52) U.S. Cl.
   CPC ...... *B60W 30/0956* (2013.01); *B60W 40/105* (2013.01); *B60W 50/14* (2013.01); *B60R 2021/0006* (2013.01); *B60R 2021/01265* (2013.01); *B60W 2050/143* (2013.01); *B60W 2050/146* (2013.01); *B60W 2520/12* (2013.01); *B60W 2554/4042* (2020.02); *B60W 2554/801* (2020.02)

(56) References Cited

FOREIGN PATENT DOCUMENTS

| | | | | |
|---|---|---|---|---|
| JP | 2014178836 | A * | 9/2014 | |
| JP | 2019046413 | A * | 3/2019 | ............ B60W 10/18 |

* cited by examiner

VEHICLE CONTROL DEVICE

CROSS-REFERENCE TO RELATED APPLICATION

This application is the U.S. bypass application of International Application No. PCT/JP2021/027543 filed on Jul. 26, 2021, which designated the U.S. and claims priority to Japanese Patent Application No. 2020-130852 filed on Jul. 31, 2020, the contents of both of which are incorporated herein by reference.

TECHNICAL FIELD

The present disclosure relates to a vehicle control device.

BACKGROUND

Devices are known in the prior art for detecting other vehicles in the vicinity of a host vehicle and for predicting a collision between the detected other vehicle and the host vehicle (for example, JP 2011-121491 A). The device of JP 2011-121491 A predicts a collision between the host vehicle and the other vehicle based on the relative time to collision, obtained by dividing the relative distance between the host vehicle and the other vehicle by their relative velocity.

SUMMARY

A vehicle control device according to a first aspect of the present disclosure includes a judgement unit and a control unit. When the host vehicle changes from a condition of traveling straight ahead in its own lane to a condition of making a right or left, to cross an oncoming traffic lane, the vehicle control device activates a safety device for suppressing a collision with an oncoming vehicle that is traveling straight along the oncoming traffic lane. The judgement unit judges whether the host vehicle is in a right or left turning condition prior to crossing the oncoming traffic lane, and if it is determined that the host vehicle is in the right or left turning condition, the control unit activates the safety device based on a time to lateral collision, obtained by dividing a lateral distance by a lateral velocity. The lateral velocity is the speed of the host vehicle in a lateral direction, orthogonal to the straight travel direction of the oncoming vehicle. The lateral distance is the distance, in the lateral direction, from the host vehicle to a predetermined vehicle traffic area, which is defined along the straight travel path of the oncoming vehicle.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
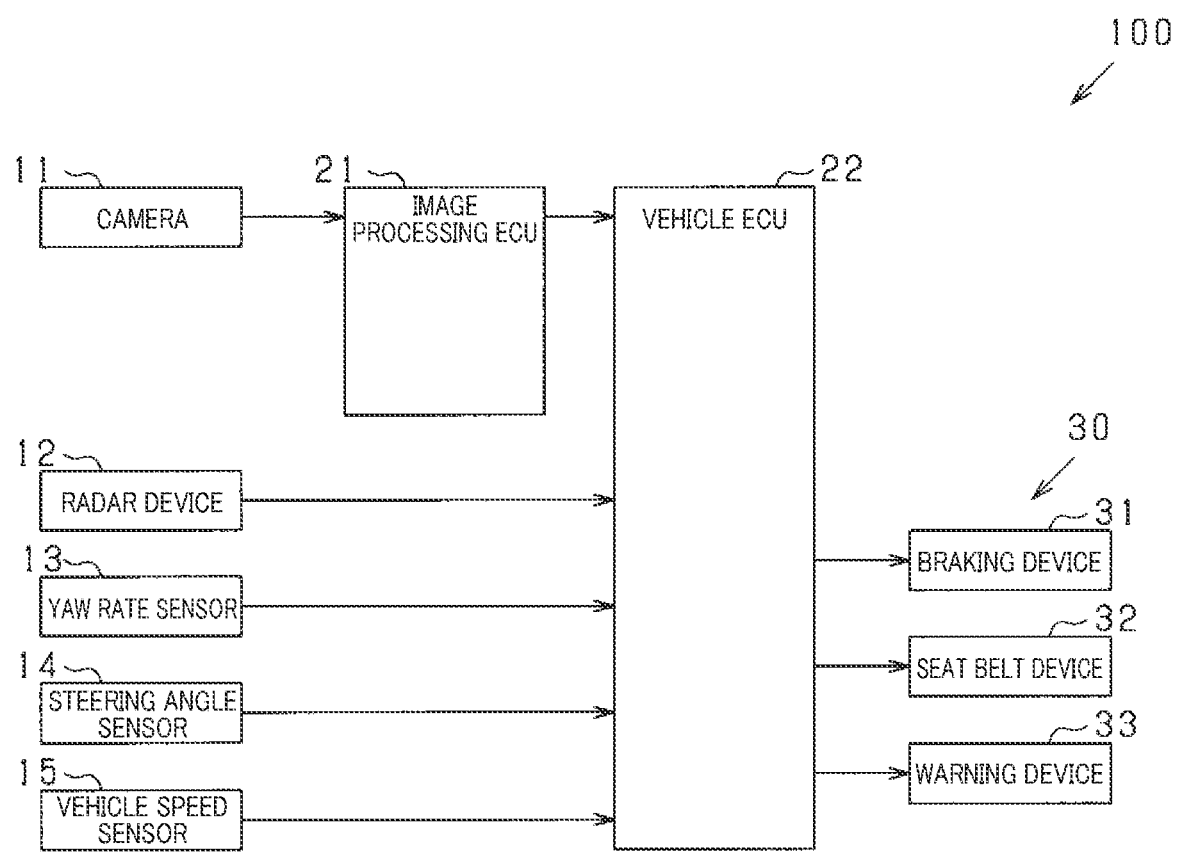
FIG. 1 is an overall configuration diagram of a driving support device.

For example, when the host vehicle changes from a condition of traveling straight to making a right turn, at an intersection with a road where traffic drives on the left side, that is, when the host vehicle turns to cross an oncoming traffic lane, the travel path of the host vehicle may intersect the travel path of an oncoming vehicle which is traveling straight along that oncoming traffic lane. In such a scene, if the oncoming vehicle is traveling straight ahead at high speed when the host vehicle is turning, then since the relative velocity becomes high, the relative time to collision becomes short. As a result, there is a danger that a safety device may be activated unnecessarily, irrespective of the relative distance.

The present disclosure has been produced in view of the above circumstances, and has the object of providing a vehicle control device capable of suppressing unnecessary activation of a safety device in a case in which the host vehicle makes a right turn or left turn to cross an oncoming traffic lane.

As means for solving the above problem, a vehicle control device is provided that includes a judgement unit and a control unit. When the host vehicle changes from a condition of traveling straight ahead in its own lane to a condition of making a right or left, to cross an oncoming traffic lane, the vehicle control device activates a safety device for suppressing a collision with an oncoming vehicle that is traveling straight along the oncoming traffic lane. The judgement unit judges whether the host vehicle is in a right or left turning condition prior to crossing the oncoming traffic lane, and if it is determined that the host vehicle is in the right or left turning condition, the control unit activates the safety device based on a time to lateral collision, obtained by dividing a lateral distance by a lateral velocity. The lateral velocity is the speed of the host vehicle in a lateral direction, orthogonal to the straight travel direction of the oncoming vehicle. The lateral distance is the distance, in the lateral direction, from the host vehicle to a predetermined vehicle traffic area, which is defined along the straight travel path of the oncoming vehicle.

If a configuration is used, for example, whereby when the host vehicle makes a right turn at an intersection with a left-side traffic road, the safety device is operated based on the relative time to collision, obtained by dividing the relative distance between the host vehicle and the oncoming vehicle by their relative velocity, there is a danger that the safety device may be activated unnecessarily, irrespective of the relative distance. That is, if the oncoming vehicle is traveling straight ahead at high speed, the relative velocity becomes high, so the relative time to collision becomes short, and hence there is concern that the safety device may be activated unnecessarily regardless of the relative distance.

Concerning that point, with the above configuration of the present disclosure, if it is judged that the host vehicle is turning to make a right or left turn and is in the right or left turning condition before crossing an oncoming traffic lane, the safety device is activated based on a time to lateral collision. The time to lateral collision is calculated by dividing a lateral distance by a lateral velocity, where the lateral velocity is the speed of the host vehicle in a lateral direction, orthogonal to the straight travel direction of the oncoming vehicle. The lateral distance is the distance, in the lateral direction, from the host vehicle to a predetermined vehicle traffic area defined along the straight travel path of the oncoming vehicle. When the host vehicle is in the right or left turning condition, values of the time to lateral collision are calculated, as the time that will elapse until there is a possibility of collision between the host vehicle and the oncoming vehicle. As a result, even if the oncoming vehicle is traveling straight ahead at high speed, it becomes possible to suppress unnecessary activation of the safety device.

Embodiments

An embodiment in which a vehicle control device according to the present disclosure is applied to an in-vehicle driving support device 100 is described in the following, referring to the drawings.

As shown in FIG. 1, a driving support device 100 according to the present embodiment includes a camera 11, a radar device 12, an image processing ECU 21, a vehicle ECU 22 as a vehicle control device, and a safety device 30.

The camera 11 is a monocular camera, and cameras 11 may be attached, for example, to the front end, the rear end and to both side surfaces of the vehicle, to capture images of the surroundings of the vehicle. The camera 11 transmits image information on the captured images to the image processing ECU 21.

The radar device 12 is a ranging device that emits high-frequency signals (ultrasonic waves) in the millimetre wave band. Radar devices 12 may be mounted, for example, on the front end, the rear end, and both side surfaces of the vehicle, to measure distances to objects in the surroundings of the vehicle. Specifically, a search wave is transmitted at predetermined intervals, and reflected waves are received by a plurality of antennas. A plurality of detection points on an object are detected using the transmission time of the search wave and the reception time of the reflected wave, and the distance to the object is thereby measured. In addition, the azimuth of the object is calculated from phase differences between reflected waves received by the antennas. By calculating the distance to the object and the azimuth of the object, the relative position of the object with respect to the host vehicle can be specified.

In addition, the radar device 12 calculates the relative speed of the object from the frequency of the reflected waves reflected by the object, which is changed by the Doppler effect. As a result, an object in the surroundings of the host vehicle can be detected as being a stationary object or as being a moving object. Specifically, if the sum of the relative speed of the object and the host vehicle speed is zero, the object is detected as being a stationary object, while if the sum of the relative speed of the object and the host vehicle speed is not zero, the object is detected as being a moving object. The radar device 12 transmits detection information on stationary objects and moving objects in the surroundings of the host vehicle to the vehicle ECU 22.

The ECUs 21 and 22 are control devices provided with known types of microcomputers, formed of a CPU, ROM, RAM, flash memory, etc. The ECUs 21 and 22 acquire various signals and perform various control operations based on the acquired information.

The image processing ECU 21 detects moving objects in the surroundings of the host vehicle based on the images captured by the camera 11. Specifically, the image processing ECU 21 calculates the relative position, with respect to the host vehicle, of each object captured by the camera 11. The image processing ECU 21 also calculates the motion speed of each object based on values of its relative position. The image processing ECU 21 calculates the optical flow of the object based on the image information transmitted from the camera 11 at predetermined intervals, and calculates the motion speed of the object based on the calculated optical flow. The optical flow is obtained by detecting a plurality of boundary points as points forming a boundary line at which there is a change of brightness in an image, and by expressing detected pluralities of boundary points as motion vectors. Moving objects in the surroundings of the vehicle are thereby detected.

The image processing ECU 21 calculates the motion path of a moving object based on the relative position and relative velocity of the object. That is, the image processing ECU 21 calculates the motion path of the moving object based on the images captured by the cameras 11. The image processing ECU 21 transmits moving object detection information to the vehicle ECU 22. The detection information includes information on the relative position and relative speed of a detected moving object with respect to the host vehicle, and the motion path of the object.

The vehicle ECU 22 operates the safety devices 30 based on the detection information concerning moving objects in the surroundings of host vehicle, sent from the radar device 12 and the image processing ECU 21. The safety devices 30 are devices for suppressing collisions between the host vehicle and objects, specifically, for avoiding a collision or reducing collision damage, and include a braking device 31, seatbelt device 32, and warning devices 33.

The braking device 31 decelerates the host vehicle based on the collision avoidance signals produced from the vehicle ECU 22. The seatbelt device 32 winds up and tighten the seatbelts, based on the collision avoidance signals produced from the vehicle ECU 22. The warning devices 33 notify the driver of the possibility of a collision, based on the collision avoidance signal produced from the vehicle ECU 22, and include, for example a device for producing an audible alarm, such as a loudspeaker or a buzzer installed in the passenger compartment of the vehicle, and devices for producing visual notifications, such as displays, etc.

A yaw rate sensor 13, a steering angle sensor 14 and a vehicle speed sensor 15 are connected to the vehicle ECU 22. The yaw rate sensor 13 is provided, for example, at a central position in the host vehicle, and outputs a yaw rate signal to the vehicle ECU 22, corresponding to the rate of variation of the steering amount of the vehicle. The steering angle sensor 14 is attached, for example, to a steering rod of the host vehicle, and outputs a steering angle signal to the vehicle ECU 22 in accordance with the rate of variation of the steering angle of the steering wheel, when operated by the vehicle driver. The vehicle speed sensor 15 is attached, for example, to a road wheel of the host vehicle. The vehicle speed sensor 15 detects the rotation direction of the wheel, and outputs a vehicle speed signal in accordance with the wheel speed to the vehicle ECU 22.

When the vehicle ECU 22 detects another vehicle as a moving object in the surroundings of host vehicle, it obtains the relative time to collision TTC, to implement collision suppression control. The relative time to collision TCC is a time to collision obtained by dividing the relative distance RTD between the host vehicle and the other vehicle by the relative velocity RV. The relative distance RTD can be derived by combining a relative distance transmitted from the radar devices 12 with a relative distance transmitted from the image processing ECU 21. The relative velocity RV can be derived by combining (fusing) a relative speed transmitted from the radar device 12 with a relative speed transmitted from the image processing ECU 21.

Figure 2:
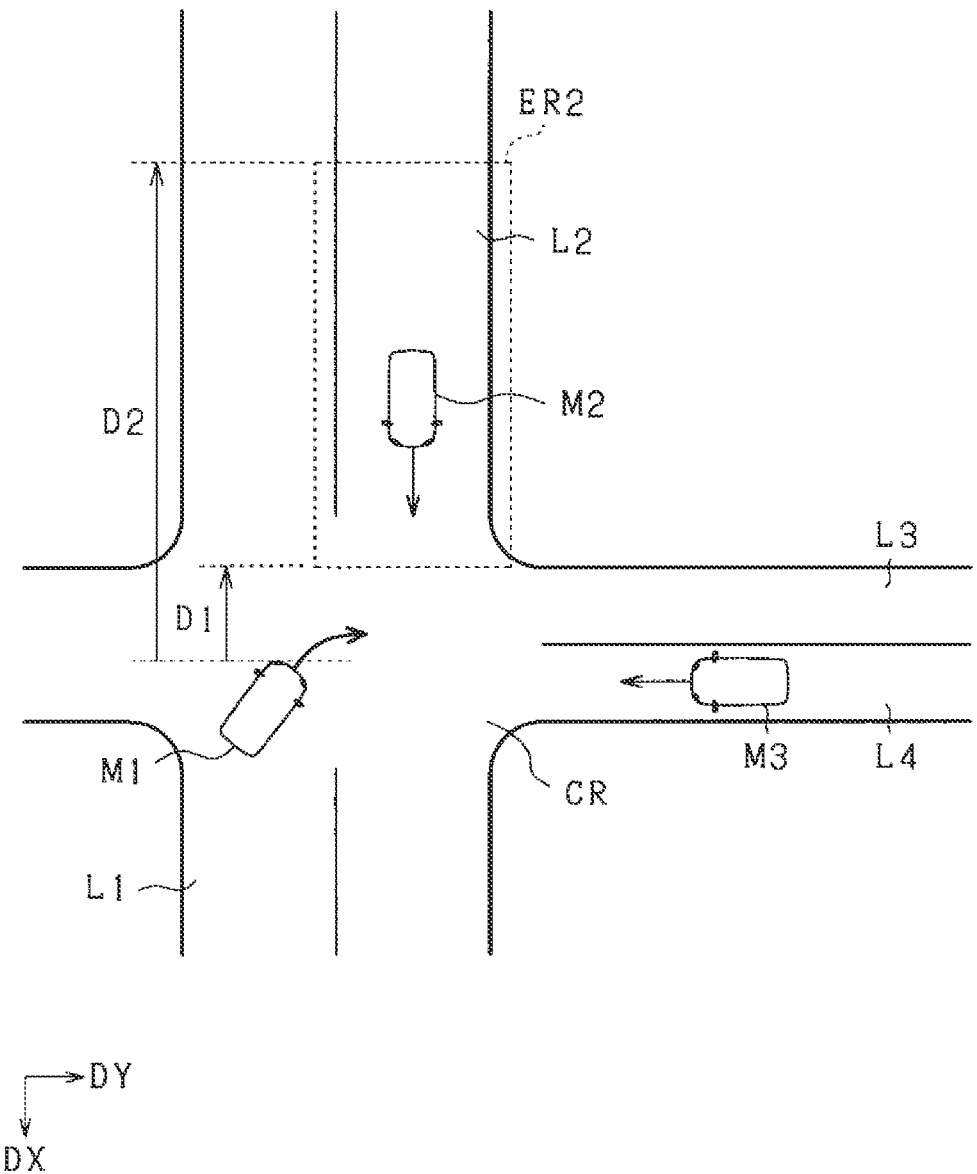
FIG. 2 is a diagram showing the positional relationship between a host vehicle and an oncoming vehicle, in a right/straight scene.

In the example shown in FIG. 2, the host vehicle M1, which is traveling straight along lane L1, makes a side turn to cross an oncoming lane L2 by turning right at the intersection CR. In that example, the travel path of the host vehicle M1 will intersect the travel path of an oncoming vehicle M2, which is traveling straight along the oncoming lane L2. In such a situation, referred to as a "right/straight scene", if the oncoming vehicle M2 is traveling straight ahead at high speed while the host vehicle M1 is turning right, the relative velocity RV becomes high. Hence, the relative time to collision TTC becomes short, so that there is a danger that the safety device 30 will be activated unnecessarily, irrespective of the relative distance RTD, if the safety device 30 is activated based on the relative time to collision TTC.

Therefore, in the collision prevention control of the present embodiment, if it is judged that the host vehicle M1 is turning to the right and is in the right-turn turning condition before crossing the oncoming lane L2, the safety device 30 is activated based on the time to lateral collision CTT instead of the relative time to collision TTC. The time to lateral collision CTT is the time obtained by dividing a lateral distance CTD by the lateral velocity CV, which is the velocity of the host vehicle M1 in the lateral direction DY, orthogonal to the straight travel direction DX of the oncoming vehicle M2. The lateral distance CTD is the lateral distance to the vehicle traffic area ER1 (see FIG. 6), defined in the lateral direction DY. In this case, the time to lateral collision CTT is calculated as the time that will elapse until the possibility of a collision with the oncoming vehicle M2 arises, when the host vehicle M1 crosses the oncoming lane L2 in a right/straight scene, that is, a situation in which the host vehicle M1 turns right and the oncoming vehicle M2 travels straight through the intersection CR. Unnecessary activation of the safety device 30 can thereby be suppressed, even if the oncoming vehicle M2 is traveling straight ahead at high speed. It should be noted that in the present embodiment, the right turn is an example of a "right or left turn", and the right-turn turning condition is an example of a "right or left turning condition".

Figure 3:
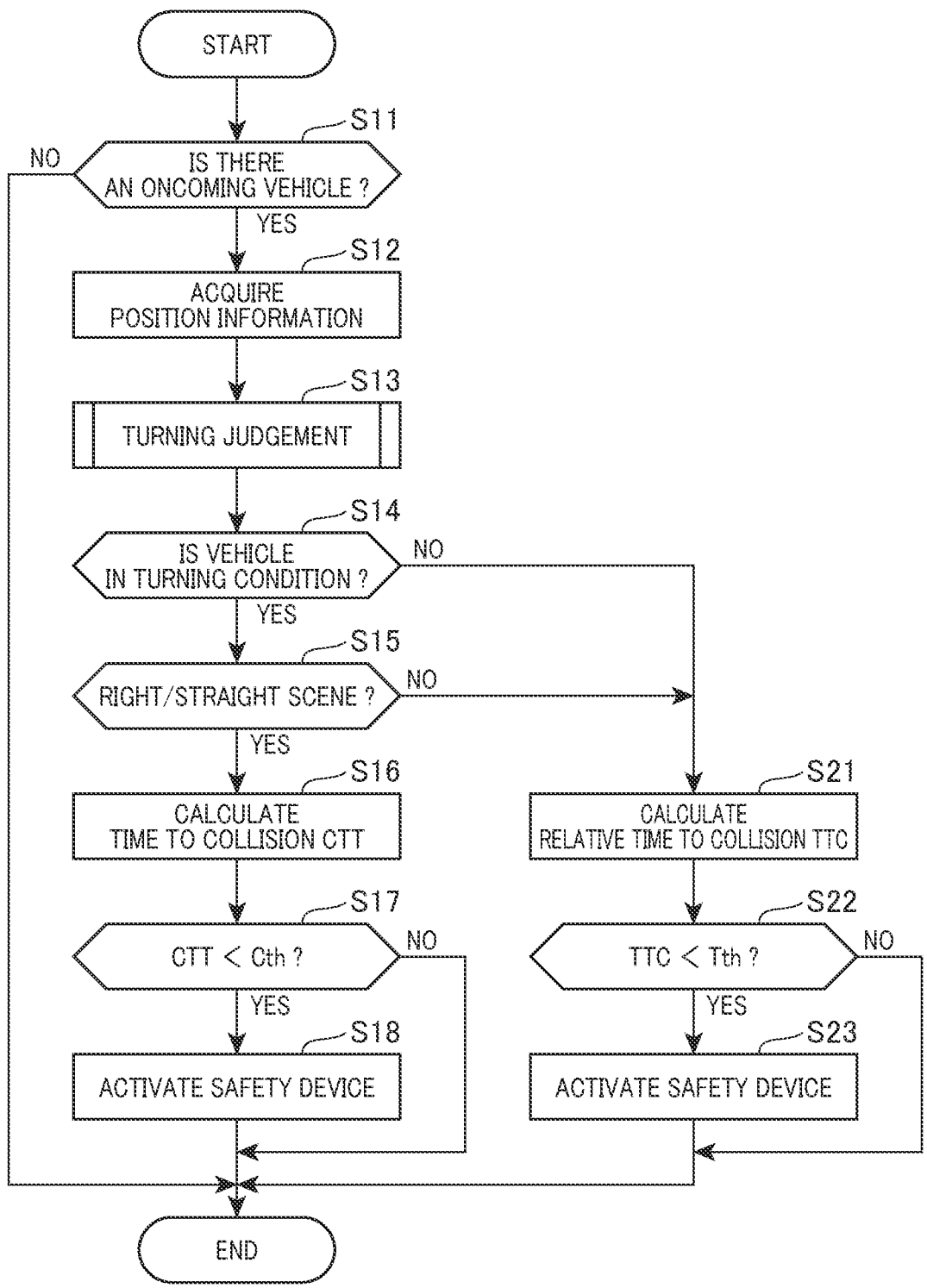
FIG. 3 is a flow diagram showing a collision suppression control process sequence.

FIG. 3 shows a flow diagram of a collision suppression control process of this embodiment. The vehicle ECU 22 repetitively executes the collision suppression control process at predetermined intervals while the host vehicle M1 is running.

In FIG. 3, first in step S11 a decision is made, based on the moving object detection information transmitted from the radar device 12 and the image processing ECU 21, as to whether there is an oncoming vehicle M2 traveling straight along the oncoming lane L2. If a negative decision is made in step S11, this process ends. However, if a positive decision is made in step S11, the relative position of the oncoming vehicle M2 is acquired as position information for the oncoming vehicle M2, in step S12.

Following step S12, in step S13, a turn judgement process is performed to determine whether the host vehicle M1 is in a right-turn turning condition. The turn judgement process will be described with reference to the flow diagram of FIG. 4.

Figure 4:
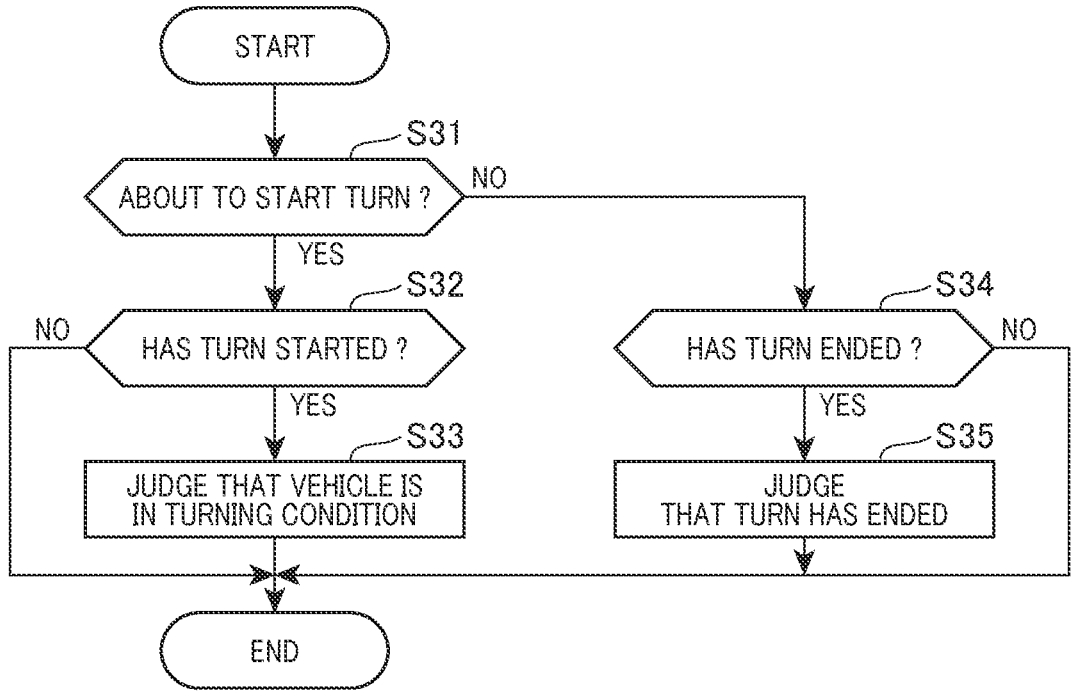
FIG. 4 is a flow diagram showing a turning judgement process.

In FIG. 4, in step S31, a decision is made as to whether the host vehicle M1 is starting to turning to the right. At this time, if the host vehicle M1 is traveling straight or is at the start of a transition from the straight travel state to the turning condition, a positive decision is made in step S31 and the process proceeds to step S32. However, if it is judged that the right turn has already started, a negative decision is made in step S31 and the process proceeds to step S34.

In step S32, a decision is made as to whether the host vehicle M1 has started to turn right from the straight-ahead state, that is, whether the vehicle has entered a right-turn turning condition. Specifically, if the turn signal of the host vehicle M1 indicates an instruction to turn right, and the turning radius of the host vehicle M1 is smaller than a predetermined turning judgement value, it is assumed that the host vehicle M1 has started to turn right, and a positive decision is made in step S32. In this embodiment, the processing of step S32 corresponds to a "turning start judgement unit".

The decision as to whether the turning radius of host vehicle M1 is smaller than the turning judgement value may be made, for example, based on whether an estimated value R of the travel path of the host vehicle M1 is less than a predetermined value. The estimated value R is calculated by dividing the yaw rate, as detected by the yaw rate sensor 13, by the vehicle speed as detected by the vehicle speed sensor 15. It would be equally possible to determine whether the turning radius of the host vehicle M1 is smaller than a turning judgement value based on whether the steering angle, as detected by steering angle sensor 14, is greater than a predetermined value.

Furthermore, in using the steering angle detected by the steering angle sensor 14 in step S32 for judging whether the vehicle M1 is in a right-turn turning condition, it would be possible to judge whether the vehicle M1 is traveling straight ahead prior to entering the right-turn turning condition, that is, to judge whether the host vehicle M1 is in an unsteady condition. This makes it possible to distinguish between a right-turn turning condition and an unsteady condition of the host vehicle M1.

If a positive decision is made in step S32, the process proceeds to step S33. In step S33, it is judged that the host vehicle M1 has entered a right-turn turning condition, and this process is then terminated. For example, if the host vehicle M1 is traveling straight ahead, a negative decision is made in step S32.

In step S34 a decision is made as to whether the vehicle M1, after starting to make a right turn, has moved forward at least to the vehicle traffic area ER1, and the right-turn turning condition has ended. In that case, the judgement that the right-turn turning condition has ended is based on the vehicle M1 having advanced to the vehicle traffic area ER1, or having advanced to a predetermined position within the vehicle traffic area ER1, after starting to turn. Specifically, if the distance advanced by the host vehicle M1 since the start of making a turn has reached a predetermined distance, then it is judged that the host vehicle M1 has advanced to the vehicle traffic area ER1 or a predetermined position within the vehicle traffic area ER1, and that the right-turn turning condition has ended. In this embodiment, the process of step S32 corresponds to a "turn end judgement unit".

It should be noted that in step S34, instead of judging whether the right-turn turning condition has ended based on the distance travelled by the host vehicle M1 from the start of making a turn until a predetermined time has elapsed, it would be equally possible to judge whether the host vehicle M1 has advanced to the vehicle traffic area ER1 or to a predetermined position within the vehicle traffic area ER1, and to judge that the right-turn turning condition has ended based on the duration that has elapsed from the time point when the turn was started. Moreover, it would be equally possible to use a configuration which utilizes each of the distance travelled by the host vehicle M1 from the start of turning and the duration that has elapsed since the turn was started. That is, the one of these that is the earliest to be established would be used as the basis for judging whether the host vehicle M1 has advanced to the vehicle traffic area ER1 or a predetermined position within the vehicle traffic area ER1.

In short, a judgement can be made in step S34 as to whether the host vehicle M1 has ended the right-turn turning condition by using at least one of the distance travelled by the host vehicle M1 from the start of turning and the elapsed time from the start of turning, for determining whether the vehicle M1 has advanced along its travel path to a predetermined position between one side and the other side of the vehicle traffic area ER1.

The following method may be used to judge whether the host vehicle M1 has ended the right-turn turning condition. It can be judged, for example, that the right-turn turning condition of the host vehicle M1 has ended if the turning radius of the host vehicle M1 becomes greater than a predetermined turn end judgement value. In that case, if the estimated value R of the travel path of the host vehicle M1 becomes greater than a predetermined value, or the steering angle detected by the steering angle sensor 14 becomes less than a predetermined value, then it is judged that the turning radius of the host vehicle M1 has become greater than the predetermined turn end judgement value.

If a positive decision is made in step S34, the process proceeds to step S35. In step S35, it is judged that the vehicle M1 has ended turning right. If a negative decision is made in step S34, this process is terminated.

Returning to FIG. 3, a decision is made in step S14 as to whether the judgement result of step S13 indicates that the vehicle is currently turning right. If the vehicle is turning right, a positive decision is made in step S14 and the process proceeds to step S15. If the vehicle is not turning right, a negative decision is made in step S14 and the process proceeds to step S21.

In step S15, a decision is made as to whether, when the host vehicle M1 starts turning right, there is an oncoming vehicle M2 within a predetermined right/straight area ER2 in the oncoming lane L2. As shown in FIG. 2, the right/straight area ER2 is defined within a predetermined distance range (distance D1 to distance D2) in the oncoming lane L2, from the host vehicle M1. More specifically, when the host vehicle M1 is about to make a right turn at the intersection, a right/straight area ER2 is defined along the oncoming lane L2, in front of the intersection. In this embodiment, the right/straight area ER2 corresponds a "straight-ahead area".

If the oncoming vehicle M2 is within the right/straight area ER2, a positive decision is reached in step S15 and the process proceeds to step S16, while if the oncoming vehicle M2 is outside the right/straight area ER2 a negative decision is reached in step S15 and the process proceeds to step S21. In that way, even when there is an oncoming vehicle M2 in the oncoming lane L2, a negative decision is made in step S15 if the oncoming vehicle M2 is outside the right/straight area ER2.

If it is judged that the host vehicle M1 is not in a right-turn turning condition or a right/straight scene, that is, if a negative decision is made in either of steps S14 and S15, then in steps S21 to S23, collision suppression control is effected for activating the safety device 30 based on the relative time to collision TTC. The collision suppression control performed in steps S21 to S23 is referred to in the following as the first control.

In the first control, the relative time to collision TTC is first calculated in step S21. The relative time to collision TTC is expressed by the following equation (Equation 1) using the relative distance RTD and the relative velocity RV.

[Math. 1]

$$TTC = RTD/RV \qquad (1)$$

Figure 5:
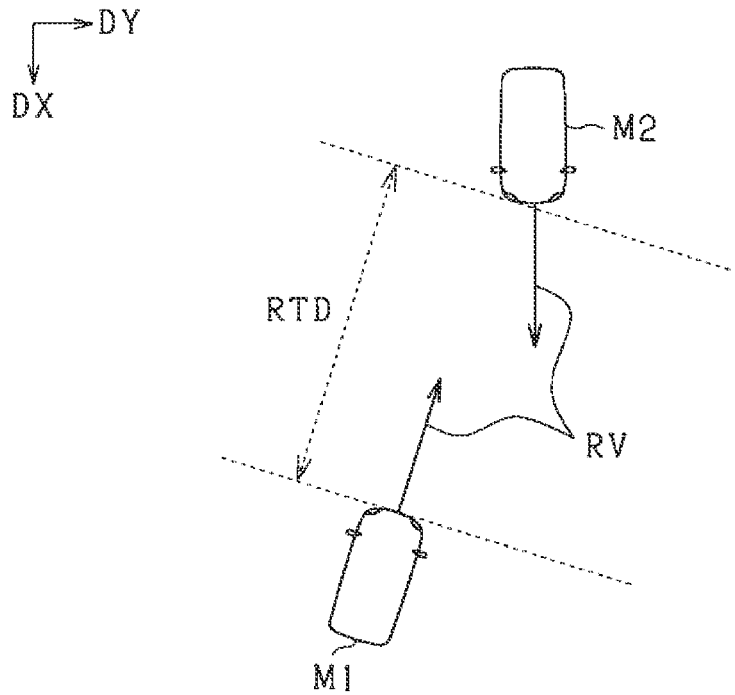
FIG. 5 is a diagram for explaining a method of calculating a relative time to collision TTC.

As shown in FIG. 5, the relative distance RTD is the distance between the host vehicle M1 and the oncoming vehicle M2 in the travel direction of the host vehicle M1.

In step S22, a decision is made as to whether the relative time to collision TTC calculated in step S21 is shorter than a predetermined first-time threshold Tth. If a positive decision is made in step S22, the safety device 30 is operated in step S23, and this process ends. If a negative decision is made in step S22, the process ends without operating the safety device 30.

On the other hand, if it is judged that the host vehicle M1 is turning right and is in a right/straight scene, that is, if the decisions made in steps S14 and S15 are both affirmative, then the time to lateral collision CTT is derived in steps S16 to S18. Collision suppression control for activating the safety device 30 based on this time to lateral collision CTT is then performed. In the following, the collision suppression control executed in steps S16 to S18 is referred to as the second control.

In the second control, the time to lateral collision CTT is first calculated in step S16. The time to lateral collision CTT is expressed by the following equation (Equation 2) using the lateral distance CTD and the lateral velocity CV.

[Math. 2]

$$CTT = CTD/CV \qquad (2)$$

Figure 6:
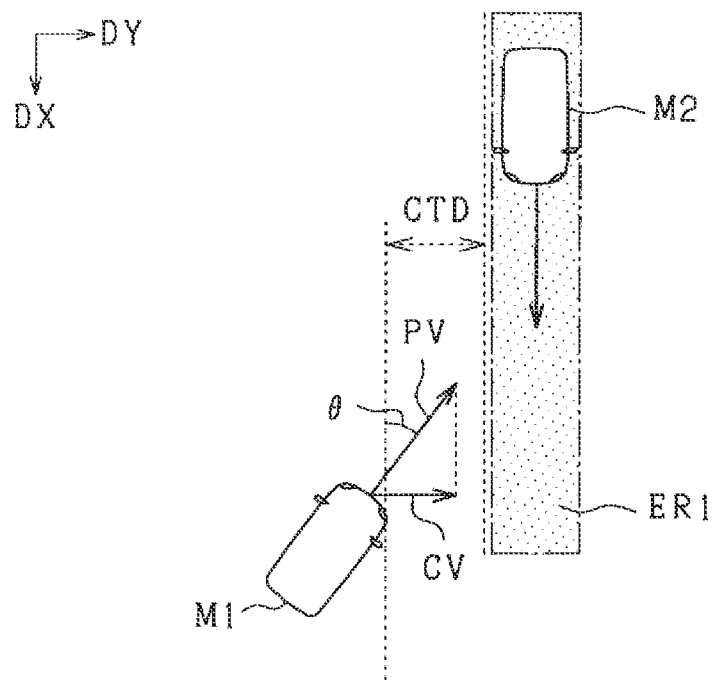
FIG. 6 is a diagram for explaining a method of calculating a time to lateral collision CTT.

As shown in FIG. 6, the lateral distance CTD is the distance in the lateral direction DY from the host vehicle M1 to the vehicle traffic area ER1, defined along the straight travel path of the oncoming vehicle M2. The edge position of the vehicle traffic area ER1 on the host vehicle M1 side (the left edge of the vehicle traffic area ER1 as viewed in the drawing) is determined with reference to the side edge of the oncoming vehicle M2 that is on the host vehicle M1 side, (the left edge of the oncoming vehicle M2 as viewed in the drawing). The width of the vehicle traffic area ER1 is defined in the lateral direction DY and corresponds to the vehicle width. The vehicle traffic area ER1 is set to extend in the straight travel direction DX of the oncoming vehicle M2.

It would be equally possible for the vehicle traffic area ER1 to be provided as an area that connects the oncoming lane L2 on both sides of the intersection CR. In such a case, the width of a vehicle traffic area ER1 is made the same as that of an oncoming lane L2.

The lateral velocity CV is the lateral component of the host vehicle velocity PV, and is expressed by the following equation (Equation 3), using the angle $\theta$ and the host vehicle velocity PV. $\theta$ is the angle between the straight travel direction DX of the oncoming vehicle M2 and the travel direction of the host vehicle M1 in the turning condition.

[Math. 3]

$$CV = PV \times \sin \theta \qquad (3)$$

In step S17, a decision is made as to whether the time to lateral collision CTT calculated in step S16 is shorter than a predetermined second time threshold value Cth. If a positive decision is made in step S17, the safety device 30 is activated in step S18, and this process then ends. On the other hand, if a negative decision is made in step S17, the process ends without activating the safety device 30. In this embodiment, the processing of steps S16 to S18 corresponds to a "control unit".

During a period in which the host vehicle M1 is judged to be turning right, in a right/straight scene, the second control activates the safety device 30 if the time to lateral collision CTT is shorter than the predetermined time that is set as the second time threshold value Cth.

The time to lateral collision CTT used in the second control is calculated based on the lateral direction velocity CV, which is the lateral component of the host vehicle velocity PV, and hence does not depend on the speed of the oncoming vehicle M2. The problem of unnecessary activation of the safety device 30 caused by the oncoming vehicle M2 traveling straight at high speed, during a period in which it is judged that the host vehicle M1 is turning right in a right/straight scene, is thereby suppressed.

Furthermore, in the collision suppression control process, after it has been judged that the host vehicle M1 has started a right turn, it is judged that the right-turn turning condition has ended if it is determined that the host vehicle M1 has moved forward at least up to the vehicle traffic area ER1. When this judgement is made that the right-turn turning condition has ended, a changeover is performed from the second control (collision suppression control based on the time to lateral collision CTT) to the first control (collision suppression control based on the relative time to collision TTC). As shown in FIG. 2, when the host vehicle M1 makes a right turn for changing its driving lane from L1 to L3, there may be another vehicle (M3) present in the oncoming lane L4, which is the opposite-direction traffic lane to lane L3, and the other vehicle M3 may be traveling straight ahead in the oncoming lane L4 toward the host vehicle M1. In that case, if the second control (collision suppression control based on the time to lateral collision CTT) were to remain in effect even after the vehicle M1 had finished turning right, there would be a danger of the safety device 30 being activated unnecessarily, due to the presence of the other vehicle M3. However, in this regard, since the second control is ended when it is judged that the right-turn turning condition of the host vehicle M1 has ended, unnecessary activation of the safety device 30 due to presence of the other vehicle M3 is suppressed.

With the present embodiment, the following effects can be obtained.

In the present embodiment, a judgement is made as to whether that the host vehicle M1 is making a right turn, and is in the right-turn turning condition prior to crossing the oncoming lane L2. If it is judged that the host vehicle M1 is in the right-turn turning condition, then the determination as to activation of the safety device 30 is made based on the time to lateral collision CTT. The time to lateral collision CTT is obtained by dividing the dividing the lateral distance CTD by the lateral velocity CV of the host vehicle M1 in the lateral direction DY. The lateral direction distance CTD is the distance from the host vehicle M1 to the vehicle traffic area ER1 in the lateral direction DY, orthogonal to the straight travel direction DX of the oncoming vehicle M2. Thus, the calculated time to lateral collision CTT is the time until there would be a possibility of collision with the oncoming vehicle M2, if the host vehicle M1 were to cross the oncoming lane L2 when in the right-turn turning condition. Unnecessary activation of the safety device 30 can thereby be suppressed, even if the oncoming vehicle M2 is traveling straight ahead at high speed.

After it is determined that the host vehicle M1 has started a right turn from a straight-ahead state and has entered a right-turn turning condition, it is judged that the right-turn turning condition has ended when the host vehicle M1 advances at least to the vehicle traffic area ER1. The safety device 30 is activated based on the time to lateral collision CTT on condition that there is an oncoming vehicle M2 in the oncoming lane L2 during the period from the decision that the host vehicle M1 has started turning until it is judged that the turning has ended, with the oncoming vehicle M2 in the predetermined straight-ahead area ER2 of the oncoming lane L2 and within a predetermined distance range (D1 to D2) from the host vehicle M1.

It is thereby made possible to perform appropriate collision suppression control with respect to the oncoming vehicle M2 after the host vehicle M1 has started turning. Furthermore, the collision suppression control based on the time to lateral collision CTT is performed only during the period extending from the start of turning by the host vehicle M1 until the end of the turn, that is, the period from the start of the right/straight scene until the end of the right/straight scene. Hence, when the host vehicle M1 makes a right turn that transfers it to another traffic lane, then even if there is another vehicle (M3) in the other traffic lane, unnecessary activation of the safety device 30 due to the other vehicle M3 can be suppressed.

The straight-ahead area ER2 is defined in the oncoming lane L2 within a predetermined distance range from the host vehicle M1, and if there is an oncoming vehicle M2 in the straight-ahead area ER2 and the time to lateral collision CTT is shorter than a predetermined time (the second time threshold value Cth), the safety device 30 is operated. The safety device 30 can thus be appropriately operated in this case, by using the time to lateral collision CTT while taking into consideration the distance between the host vehicle M1 and the oncoming vehicle M2 that is traveling straight along the oncoming lane L2.

In the case in which the host vehicle M1 makes a right turn for transitioning to another lane, it is desirable to appropriately judge when the turn has ended, in order to suppress unnecessary activation of the said directed to another vehicle M3 which may present in the other lane. In this respect, the judgement that the right-turn turning condition of the host vehicle M1 has ended can be made by using the travel distance and elapsed time since the host vehicle M1 started the turn, and by determining whether the host vehicle M1 has advanced to a predetermined position between one side and the other side of the vehicle traffic area ER1. Unnecessary activation performed immediately after executing the right turn can thereby be appropriately suppressed.

It is preferable to operate the safety device 30 based on the relative time to collision TTC when the host vehicle M1 is traveling straight along its own lane L1 and there is another vehicle ahead of the host vehicle M1, traveling in the travel direction of the host vehicle M1. With the present embodiment, in such a situation, i.e., if it is judged that the scene is not a right/straight scene, the first control is applied for activating the safety device 30 based on the relative time to collision TTC, while if it is judged that the scene is a right/straight scene, then a changeover is performed to the second control, for activating the safety device 30 based on the time to lateral collision CTT. As a result, the safety device 30 can be appropriately operated by using a time to collision in accordance with the running condition of the host vehicle M1.

Other Embodiments

It should be noted that each of the above-described embodiments may be modified as follows.

In the above embodiments, a configuration is used in which the safety device 30 is activated based on the time to lateral collision CTT on condition that, when the host vehicle starts to make a right turn, there is an oncoming vehicle M2 within the straight-ahead area ER2. However this may be changed. For example, the safety device 30 may be activated based on the time to lateral collision CTT on condition that, at an intermediate time point between the start and completion of the right turn, it is judged that there is an oncoming vehicle M2 within the straight-ahead area ER2. In that case, it can be judged that the scene is a right/straight scene if the oncoming vehicle M2 is detected as being within the right/straight area ER2, by the camera 11 or the radar device 12, during at least a predetermined period of time.

It is equally possible to use a configuration in which the distance range from the host vehicle M1 to the straight-ahead area ER2 is set based on the speed of the oncoming vehicle M2. Specifically, in that case the vehicle ECU 22 uses the relationship shown in FIG. 7 to variably set the distance D2 (see FIG. 2), which defines the right/straight area ER2, based on the speed of the oncoming vehicle M2. The distance D1 is assumed to be a fixed value. In that case, the higher the speed of the oncoming vehicle M2, the greater will become the distance D2 that is set. Therefore, the higher the speed of the oncoming vehicle M2, the larger will the right/straight area ER2 be set, that is, the longer will the right/straight area ER2 become in the straight travel direction DX. In that case, the vehicle ECU 22 corresponds to a "setting unit".

When the host vehicle M1 makes a right turn at the intersection CR, the higher the speed of the oncoming vehicle M2, the greater becomes the possibility that an oncoming vehicle M2 which is farther from the intersection CR will collide with the host vehicle M1. In this regard, by setting the distance range (D1-D2) of the straight-ahead area ER2 from the host vehicle M1 based on the speed of the oncoming vehicle M2, the safety device 30 can be appropriately activated, irrespective of the speed of the oncoming vehicle M2.

Figure 7:
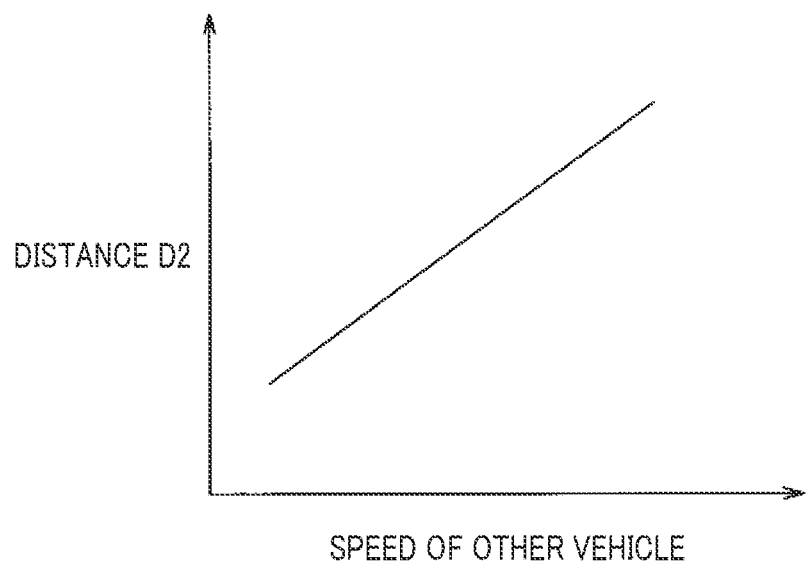
FIG. 7 is a diagram showing a relationship between the speed of an oncoming vehicle and a distance D2.

In the relationship shown in FIG. 7, the minimum value of the distance D2 may be set equal to the distance D1 when the speed of the oncoming vehicle M2 is zero. That is, if the speed of the oncoming vehicle M2 is zero, the width of the distance range (D1 to D2) becomes zero, and no right/straight area ER2 is set. It thereby becomes possible to suppress unnecessary activation of the safety device 30 directed to an oncoming vehicle M2 that is halted before the intersection.

In the above embodiment, an example is described in which the collision prevention control process is performed when the vehicle travels on a road where driving is on the left-hand side. However, the same process can be applied in the case of driving on the right-hand side, by left/right inversion.

In the above embodiment, object detection is performed using the detection results from a camera 11 which is a monocular camera, and the detection results from a radar device 12, that is, objects are detected using a fusion method. However, it would be equally possible, for example, to use a stereoscopic camera as the camera 11, with objects being detected based on the detection result from the stereoscopic camera.

In the above-described embodiment, an example is described in which a vehicle ECU 22 corresponds to the vehicle control device, however the present invention is not limited to this, and a combination of the image processing ECU 21 and the vehicle ECU 22 may correspond to the vehicle control device. In other words, the vehicle control device may generate detection information concerning moving objects in the surroundings of vehicle, based on images captured by the camera 11.

The vehicle controller and techniques described in this disclosure may be implemented by a dedicated computer, configured with a processor and a memory, programmed to perform one or more functions embodied by a computer program. Alternatively, the vehicle controller and techniques described in this disclosure may be implemented by a dedicated computer implemented by configuring a processor with one or more dedicated hardware logic circuits. Alternatively, the vehicle control device and techniques described in this disclosure may be implemented by one or more dedicated computers each configured by a combination of a processor and memory programmed to perform one or more functions and a processor configured by one or more hardware logic circuits. The computer program may be stored as computer-executable instructions on a computer-readable non-transitional tangible recording medium.

Although the present disclosure has been described with reference to examples, it is to be understood that the present disclosure is not limited to such examples or structures. The scope of the present disclosure also extends over various modifications including modifications that are within a range of equivalents. In addition, various combinations and configurations, as well as combinations and configurations comprising single elements, more, or less, come within the scope of this disclosure.

What is claimed is:

1. A vehicle control device which activates a safety device for suppressing collision between a host vehicle and an oncoming vehicle that is traveling straight along an oncoming traffic lane, when the host vehicle changes from traveling straight along its own traffic lane to making a right or left turn to cross the oncoming traffic lane, the vehicle control device comprising:

a judgement unit and a control unit, the judgement unit judges when the host vehicle is turning to make the right or left turn, and is in the right or left turning condition before crossing the oncoming traffic lane, and when it is judged that the host vehicle is in the right or left turning condition, the control unit activates the safety device based on a time to lateral collision obtained by dividing a lateral distance by a lateral velocity, where the lateral velocity is a speed of the host vehicle in a lateral direction orthogonal to the straight travel direction of the oncoming vehicle and the lateral distance is the distance, in the lateral direction, from the host vehicle to a predetermined vehicle traffic area defined in the oncoming traffic lane along a straight travel path of the oncoming vehicle, wherein the judgement unit includes:

a turning start judgement unit that judges when the host vehicle has started turning to perform the right or left turn from a straight-ahead state, and has entered the right or left turning condition, and a turn end judgement unit which, after it is determined that the right or left turn has started, judges when the right or left turning condition has ended, based on the host vehicle having advanced at least to the vehicle traffic area; wherein the vehicle control device activates the safety device based on the time to lateral collision on condition that, during the period from the time at which it is judged that the host vehicle has started turning until the time at which it is judged that the turning has ended, the oncoming vehicle is present in a predetermined straight-ahead area and is within a predetermined range of distance from the host vehicle.

2. The vehicle control device according to claim 1, wherein the vehicle control device activates the safety device in response to, during the period from the start of turning to the end of turning by the host vehicle, the oncoming vehicle being present within the straight-ahead area and the time to lateral collision being shorter than a predetermined time duration.

3. The vehicle control device according to claim 1, further comprising:

a setting unit that sets the predetermined range of distance of the straight-ahead area from the host vehicle in accordance with a speed of the oncoming vehicle.

4. The vehicle control device according to claim 1, wherein the turn end judgement unit uses at least one of the distance travelled by the host vehicle from the time point of starting the turn and the elapsed time from the time point of starting the turn, in determining that the right or left turning condition has ended, by judging whether the host vehicle has advanced to a predetermined position between one side and the other side of the straight-ahead area.

5. The vehicle control device according to claim 1, wherein the control unit implements a first control, constituting collision suppression control that activates the safety device based on a relative time to collision, with the relative time to collision being obtained by dividing the relative distance between the host vehicle and another vehicle which is ahead of the host vehicle in the travel path of the host vehicle by the relative velocity between the host vehicle and the other vehicle, and implements a second control that activates the safety device based on the time to lateral collision, and when it is judged that the host vehicle is not in the right or left turning condition, the first control is executed, while when it is judged that the host vehicle is in the right or left turning condition, a changeover is performed from execution of the first control to execution of the second control.

* * * * *